United States Patent [19]

Grant

[11] Patent Number: 4,878,931
[45] Date of Patent: Nov. 7, 1989

[54] TWO STAGE VAPOR RECOVERY SYSTEM

[75] Inventor: David C. H. Grant, Gainesville, Fla.
[73] Assignee: Quadrex HPS Inc., Gainesville, Fla.
[21] Appl. No.: 237,744
[22] Filed: Aug. 29, 1988
[51] Int. Cl.⁴ .............................................. F25J 3/00
[52] U.S. Cl. ........................................ 62/17; 34/73; 34/79; 55/23
[58] Field of Search ...................... 62/9, 11, 17; 34/73, 34/79; 55/23

[56] References Cited

U.S. PATENT DOCUMENTS

| | | | |
|---|---|---|---|
| 2,006,295 | 6/1935 | Chewning | 261/98 |
| 2,250,949 | 7/1941 | Gerlach | 55/23 |
| 3,100,693 | 8/1963 | Klein et al. | 23/262 |
| 3,102,012 | 8/1963 | Dowd | 55/23 |
| 3,106,462 | 10/1963 | Cottle | 55/20 |
| 3,122,594 | 2/1964 | Kielback | 261/94 |
| 3,296,309 | 1/1967 | Rooij | 260/606 |
| 3,810,348 | 5/1974 | Byers et al. | 55/91 |
| 3,947,258 | 3/1976 | Decker | 55/88 |
| 4,002,705 | 1/1977 | McKeown | 261/98 |
| 4,044,078 | 8/1977 | Curtis et al. | 261/30 |
| 4,126,431 | 11/1978 | Wolowski et al. | 55/23 |
| 4,424,680 | 1/1984 | Rothchild | 62/11 |
| 4,533,367 | 8/1985 | Hadzismajlovic | 55/91 |
| 4,551,981 | 11/1985 | Banerjee | 62/11 |
| 4,670,027 | 6/1987 | Becker et al. | 55/48 |

Primary Examiner—Ronald C. Capossela
Attorney, Agent, or Firm—Barnard A. Reiter; Mark G. Bocchetti

[57] ABSTRACT

Disclosed is a system for recovering vapor from an air/vapor process stream. The system is operated in two stages, a high temperature stage and a low temperature stage. The high temperature stage may be referred to as a condenser column. The low temperature stage is referred to as the stripper column. The air/solvent vapor stream is conducted first through the condenser column and then through the stripper column. A countercurrent flow of liquid solvent is provided to both the condenser column and the stripper column. In the low temperature stage (condenser column), the countercurrent flow of liquid solvent is at a temperature near but above the freezing point of water. This results in the removal of most of the solvent vapor and water vapor from the air/solvent vapor mixture. The process stream next flows through the stripper column which has a countercurrent flow of liquid solvent below the freezing point of water which serves to remove the remaining solvent vapor and water vapor contained in the process stream. The system may be operated on a once through basis although better overall recovery will be accomplished if the system is operated in a recirculation mode. Because it is operated in two stages, there is accomplished a significant reduction in the power requirements of the refrigeration system. Further, the removal of the majority of the water vapor from the process stream prior to the low temperature stage significantly reduces the problems created by fouling of the stripper column by water ice.

11 Claims, 3 Drawing Sheets

TWO STAGE VAPOR RECOVERY SYSTEM

BACKGROUND OF THE INVENTION

1. Field of the Invention

The present invention relates generally to vapor recovery systems and more particularly to two stage vapor recovery systems for the separation of solvent vapor from air.

2. Brief Description of the Prior Art

For the purpose of vapor recovery, various methods have been employed to remove the vapor from an air/vapor mixture. One method which has been employed for that purpose is to condense the vapors and to collect the resulting liquid. Another is to drive the air/mixture through an adsorber which preferentially adsorbs the vapor. The adsorbed vapor might then be separated out for reclamation. The combination of condensation and adsorption have also been employed for the purpose of vapor recovery.

Merely performing vapor recovery through condensation by countercurrent flow, although effective, is not without problems. Lowering the temperature of the air/vapor mixture in one stage necessitates rather high refrigeration power requirements. Further, lowering the temperature of the air/vapor mixture in a single stage to below 32° F. creates the additional problem of the formation of ice within the condenser, whether that condenser be a packed column countercurrent flow arrangement, a shell and tube heat exchanger or any other typical condenser arrangement. The formation of water ice will restrict flow through the condenser reducing the efficiency of the condenser and ultimately requiring the condenser to be shut down so that it can be thawed out.

These problems can be significantly reduced by operating a vapor recovery system in two stages, a low temperature stage and a high temperature stage. The high temperature stage would be above the freezing point of water and the low temperature stage would be below the freezing point of water. By taking 60% to 70% of the refrigeration load during the high temperature stage, the refrigeration power requirements can be reduced by approximately 50%. Further, an additional effect of having a first high temperature stage is to remove most of the incoming water contained in the air/vapor mixture. Therefore, there will be less water and consequently, less water ice formed in the low temperature stage reducing the need for shut downs of the vapor recovery systems.

SUMMARY OF THE INVENTION

Accordingly, it an object of the present invention to provide a vapor recovery system for the removal of solvent vapor from an air/solvent vapor mixture.

Another object of the present invention is to provide a two stage vapor recovery system whereby substantially all of the solvent vapor in an air/solvent vapor mixture is separated from the air with reduced and efficient refrigeration power requirements.

A further object of the present invention is to provide a two stage vapor recovery system which includes means for stripping out the maximum amount of water in its liquid form thus reducing water ice problems.

Yet another object of the present invention is to provide for the stripping out of a major fraction of the solvent above the temperature at which solvent/water hydrate forms.

Briefly stated, the foregoing and numerous other features, objects and advantages of the present invention will become readily apparent upon a reading of the detailed description, claims and drawings set forth hereinafter. These features, objects and advantages are accomplished through the use of a two stage vapor recovery system comprised of a stacked column. The upper portion of the stacked column is a stripper column. The lower portion of the stacked column is a condenser column. Below the condenser column is a sump. An air/vapor mixture enters the system travelling upward through the condenser column and then through the stripper column.

A countercurrent flow of liquid solvent is circulated to the top of the stripper column at a temperature below 32° F. The temperature of the countercurrent flow of liquid solvent should be maintained low enough to ensure good recovery of solvent vapor from the air/vapor process stream. A temperature of approximately $-20°$ F. has been found to be both practical and effective for Freon-113. Note that Freon-113 freezes at $-31°$ F. For other solvent with lower freezing points, the vapor recovery system of the present invention could benefit from temperatures as low as $-60°$ F. to $-100°$ F. However, there is a point of diminishing return at which the additional vapor recovery is not significant enough to justify generating such low temperatures particularly if the system is being operated on a recirculating basis as opposed to a once through basis.

A second countercurrent flow of liquid solvent at a temperature of approximately 35° F. is circulated to the top of the condenser column. The majority of the solvent vapor is condensed in the condenser column and drains to the sump. More than a majority of the solvent vapor remaining in the air is removed in the stripper column. The concentration of solvent in the air/solvent vapor mixture after it exits the stripper column is dependant upon the lowest temperature the air/solvent vapor temperature sees and the vapor pressure curve (physical characteristics) of the solvent.

The liquid solvent and condensed solvent vapor draining to the base of the stripper column is circulated through a heat exchanger, recooled and recirculated back to the top of the stripper column. This recirculation loop is essentially a closed loop in that all of the solvent used for stripping and condensing is returned to sump.

Water is separated from the solvent in the sump. Solvent from the sump is circulated through a heat exchanger to the top of the condenser column. The two heat exchangers used for circulation to the tops of the stripper and condenser columns utilize a single refrigeration system.

DETAILED DESCRIPTION OF THE PREFERRED EMBODIMENT

Figure 1:
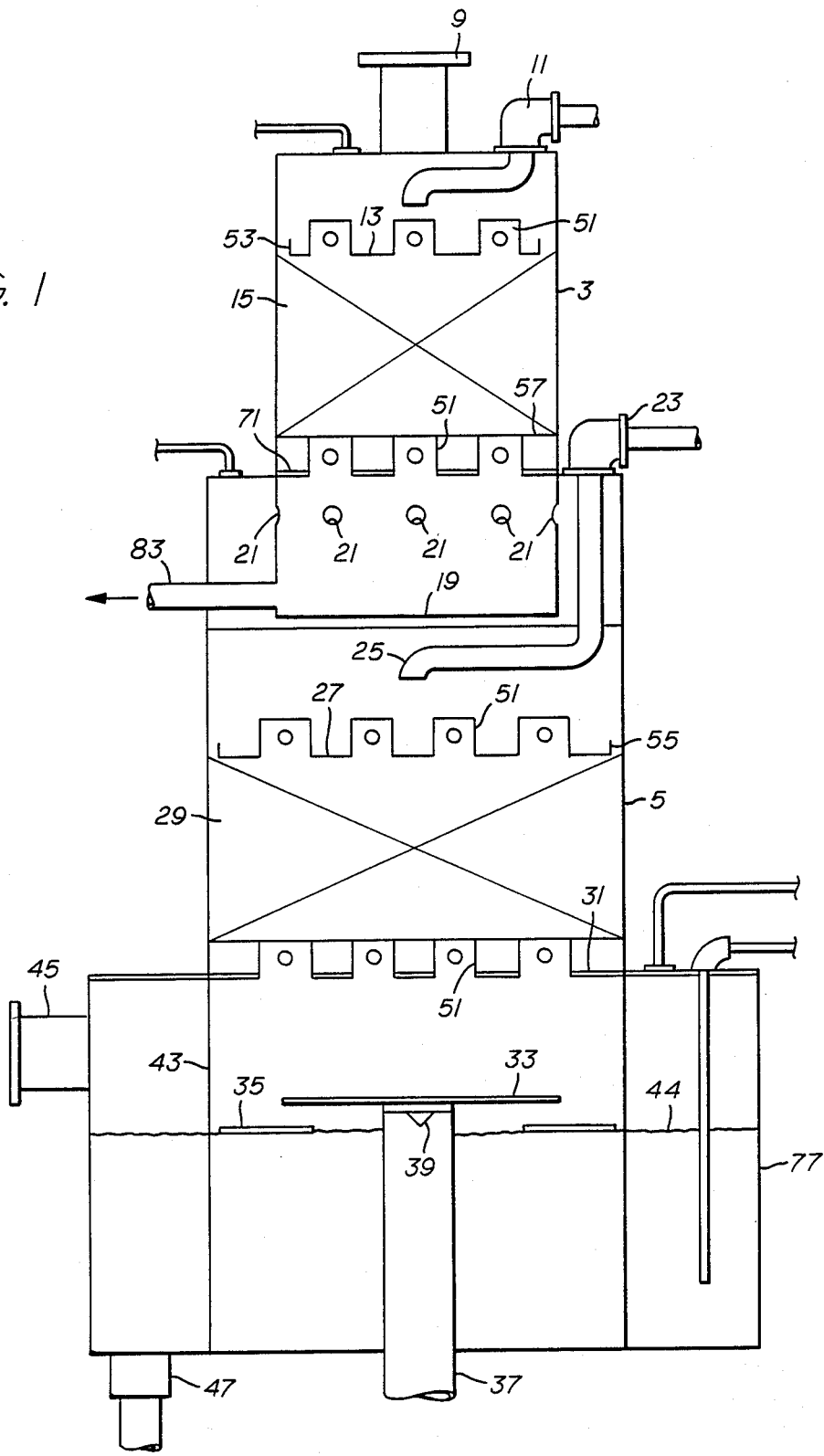
FIG. 1 is a schematic of the vapor recovery system stacked column of the present invention

Turning first to FIG. 1, there is shown a stacked column 1. The upper portion of stacked column 1 is stripper column 3. Located below stripper column 3 is a condenser column 5. Condenser column 5 is mounted on top of cold sump 7. Located at the top of stripper column 3 is exit nozzle 9. Also located at the top of stripper column 3 is liquid stripper solvent inlet nozzle 11 through which solvent is delivered to distribution plate 13. Distribution plate 13 ensures equal distribution of liquid stripper solvent across the cross-section of stripper column 3. As liquid stripper solvent flows downward through stripper column 3 and through distribution plate 13, it then passes through packing 15. Packing 15 is preferably 15 cm 304 stainless steel saddles functioning to provide intimate contact between the incoming cold liquid stripper solvent and the exiting air/vapor mixture. Packing 15 is supported by distribution plate 17. The function of distribution plate 17 is to ensure that the air/vapor mixture circulating upward through stripper column 3 is evenly distributed across the cross-section of stripper column 3. Located below distribution plate 17 is transition sump 19 which resides within the upper portion of condenser column 5. Transition sump 19 has located in the sides thereof passages 21 through which the air/vapor mixture exiting condenser column 5 can pass thus allowing flow of the air/vapor mixture through distribution plate 17 and into stripper column 3.

Located at the top of condenser column 5 is liquid condenser solvent inlet nozzle 23 which via conduit 25 allows for the delivery of liquid condenser solvent onto distribution plate 27. The liquid condenser solvent passes evenly through distribution plate 27 and into packing 29. Packing 29 is identical to packing 15. Packing 29 is supported on distribution plate 31 which serves to evenly distribute the air/vapor mixture flowing upward through packing 29 in condenser column 5.

Figure 2A:
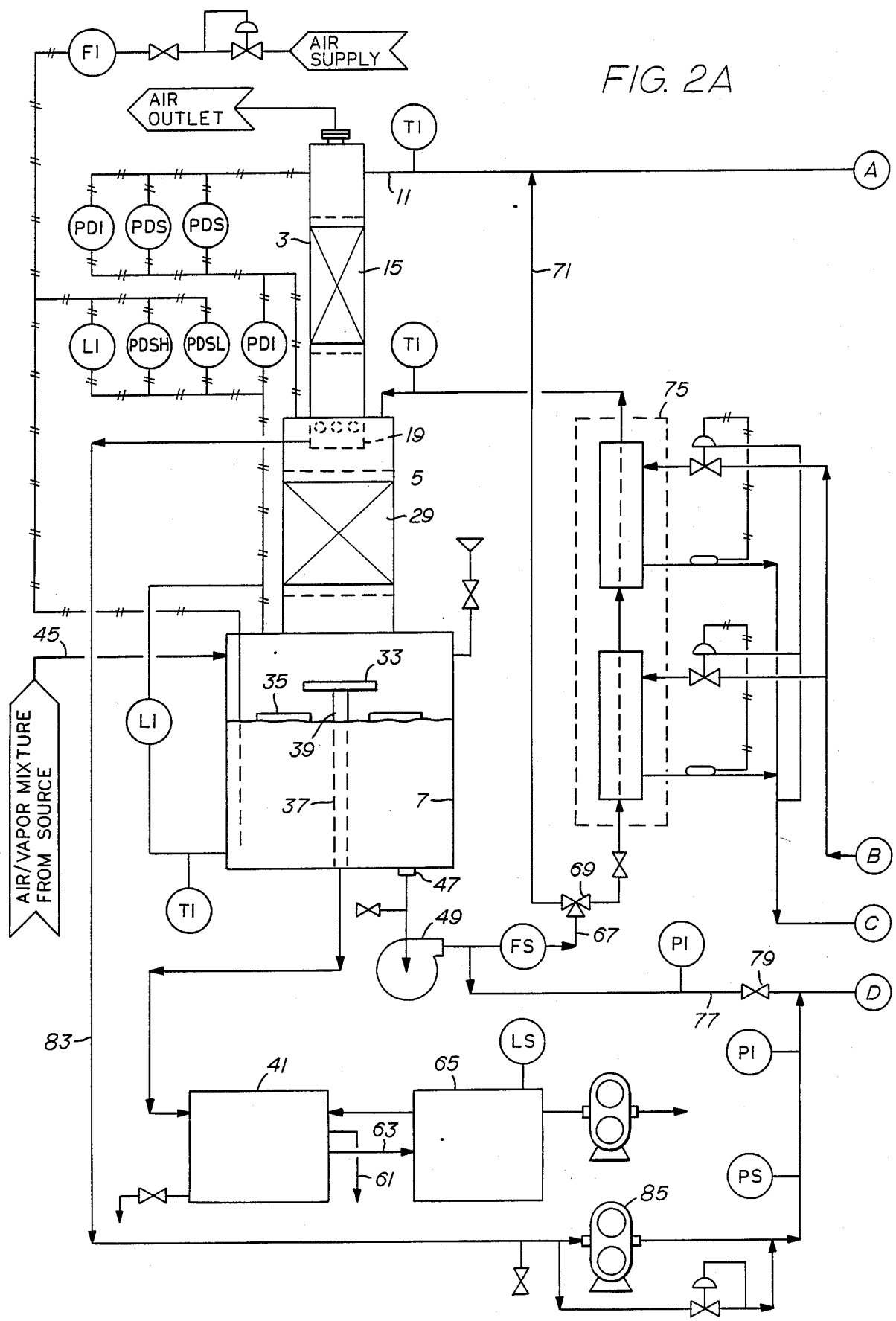
FIG. 2 is a flow diagram of the system of the present invention.
Figure 2B:
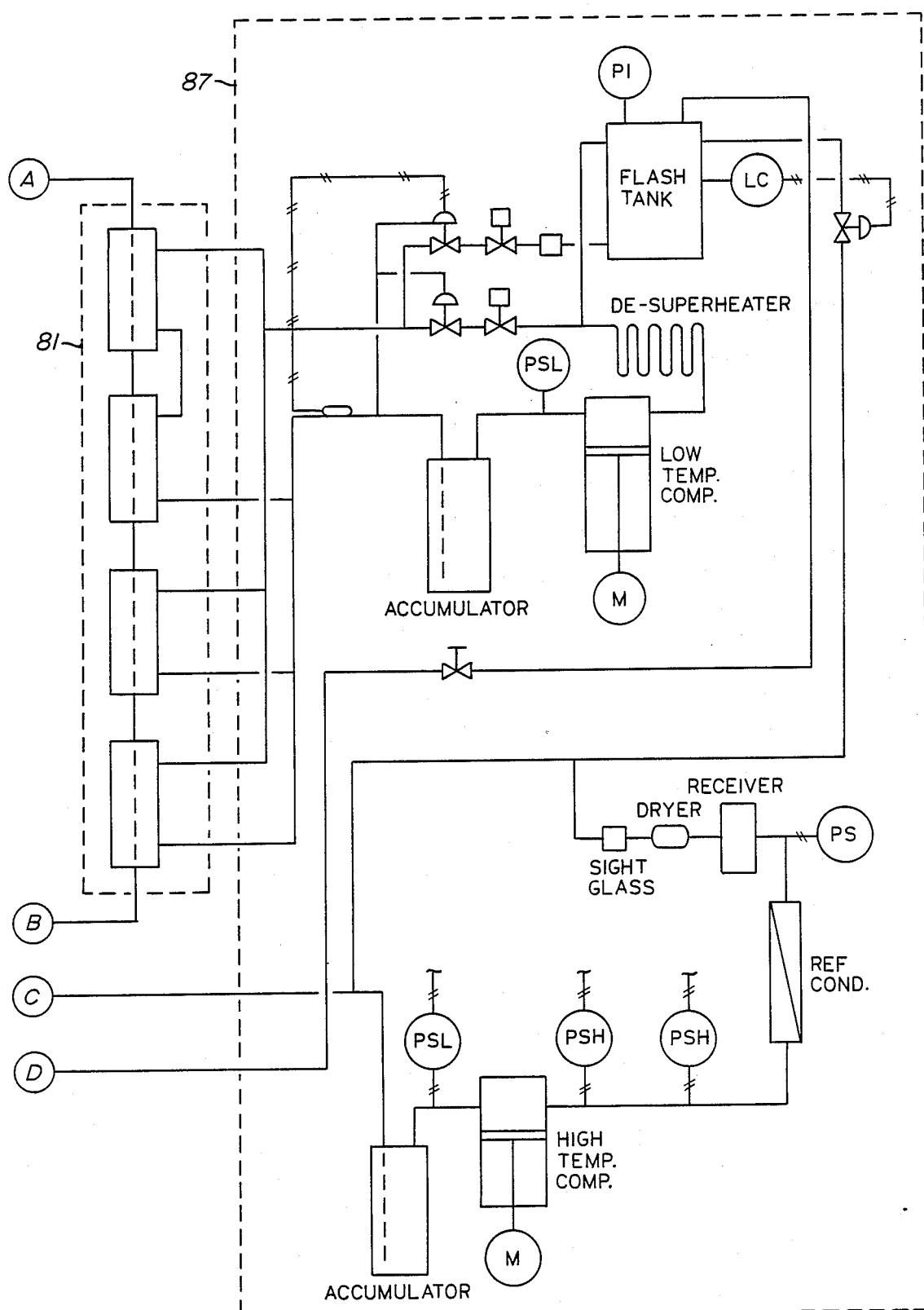

The liquid flowing downward through distribution plate 31 falls into cold sump 7 and onto splash plates 33 and 35 (now referring to FIGS. 1 and 2 jointly). Splash plate 33 is substantially circular and splash plate 35 is substantially doughnut shaped. Both splash plates 33 and 35 are supported on the top of overflow pipe 37. The function of splash plates 33 and 35 is to absorb the downward impact of liquid dropping out of the bottom of the condenser column 5. Splash plates 33 and 35 are so arranged that as the liquid enters the cold sump pool it is travelling in a horizontal direction. This arrangement helps keep any entrained water or ice from being driven below the cold sump liquid surface and is the first step of the water separation process incorporated into the present invention. Water and ice, being lighter than the solvent, float on the surface within cold sump 7 and overflow via notched weir 39 in overflow pipe 37 into water separator 41.

Within cold sump 7 there is provided a cylindrical shield 43 which is actually an extension of the shell of condenser column 5. Shield 43 serves to distribute the incoming air/vapor mixture entering via inlet nozzle 45. It further serves to guide the water and ice contained within cold sump 7 away from nozzle 47 from which high temperature pump 49 takes suction. This is accomplished by providing shield 43 with holes (not shown) at the solvent liquid surface level 44. There are preferably three of such holes located at angles of 90°, 180° and 270° from inlet nozzle 45. Such holes are located so that each hole is approximately bisected by liquid surface level 44. There are additional holes (also not shown) through shield 43 at the base of shield 43 where it attaches to the bottom of cold sump 7.

Distribution plates 13, 17, 27 and 31 each have bubble caps 51. Bubble caps 51 have holes in them to allow for three distinct functions to take place. Those are the even distribution of flow of the air/vapor mixture upward; the even distribution of liquid flow downward; and the downward flow of solids such as water ice, if present.

Distribution plates 13 and 27 include containment rings 53 and 55 respectively. Containment rings 53 and 55 hold liquid on the distribution plates 13 and 27 until it overflows into the packing through the holes in bubble caps 51. This feature eliminates the need for a close fit and seal between the column walls and the distribution plates.

Supported on the top of bubble caps 51 of distribution plate 17 is an expanded metal plate 57. Expanded metal plate 57 prevents packing 15 from passing through the distribution plate bubble caps 51 into the transition sump 19. Similarly, there is an expanded metal plate 59 supported on top of bubble caps 51 of distribution plate 31 serving the function of preventing packing 29 passing through distribution plate 31 into the cold sump 7.

The solvent and water flowing through overflow pipe 37 preferably enters water separator 41 in such a way that the flow is substantially horizontal so that it is not driven below the liquid surface contained within the water separator 41. An extended flow path for the solvent is provided to allow time for the gravimetric separation of the water from the solvent. Water exits water separator 41 to drain via conduit 61. Solvent exits water separator 41 via conduit 63 and enters receiver 65.

High temperature pump 49 taking suction from cold sump 7 via nozzle 47 circulates solvent through conduit 67 to three way motor operated valve 69. Motor operated valve 69 control flows of solvent through conduit 71 up to stripper liquid solvent inlet nozzle 11 and also through conduit 73 and heat exchanger 75 to condenser liquid solvent inlet nozzle 23. Branching off from conduit 67 between high temperature pump 49 and the motor operated valve 69 is conduit 77. Solvent from cold sump 7 can be pumped via high temperature pump 49 through conduit 77, cross-over valve 79 and heat exchanger 81 to stripper liquid solvent inlet nozzle 11. Heat exchanger 81 may actually be a plurality of heat exchangers operated in series as depicted within dotted lines identified in FIG. 2 as heat exchanger 81. The purpose of cross-over valve 79 is to allow crossover of solvent from the high temperature solvent circuit to the low temperature side.

Solvent captured within transition sump 19 exits transition sump 19 via conduit 83 which supplies low temperature pump 85. Low temperature pump 85 pumps solvent through heat exchanger 81 back to stripper liquid solvent inlet nozzle 11.

Cooling via heat exchangers 75 and 81 is accomplished through refrigeration system 87. Refrigeration system 87 can be considered in two parts, a high temperature system and a low temperature system. The high temperature refrigeration system function is to chill the flow of solvent in the high temperature solvent circuit, that being through high temperature pump 49 and heat exchanger 75 to condenser liquid solvent inlet nozzle 23. Assuming that the solvent is "Freon-113", depending on the inlet load and environmental conditions, the temperature of the solvent being fed to the top of the condenser column 5 will ideally be 33° F. to 35° F. Higher temperatures can be seen due primarily to limitations in the refrigeration system. With proper design a temperature of 35° F. can be maintained. The temperature of the cold sump 7 will track about 5° F. to 10° F. higher than the temperature of the solvent as it enters the condenser liquid solvent inlet nozzle 23.

The low temperature system function is to chill the solvent circulating through the low temperature solvent circuit, that circuit being from transition sump 19 through conduit 83, low temperature pump 85 and heat exchanger 81 to stripper liquid solvent inlet nozzle 11. The temperature of the solvent entering stripper column 3 at stripper liquid solvent inlet nozzle 11 determines, in large measure, the recovery performance of the vapor recovery system of the present invention. Again, in the case of "Freon- 113", it is important to keep the temperature of this stream at −20° F. or below (−20° F. through −30° F.) for optimum performance.

Generally, the high temperature refrigeration system provides high pressure refrigerant for heat exchanger 75 which may, actually be more than a single heat exchanger operated in series. Note in FIG. 2 there are two heat exchangers operating in series contained within the dotted lines identified as heat exchanger 75. Refrigerant is evaporated to an intermediate pressure (temperature) adequate to maintain the temperature of the solvent at condenser solvent inlet 23 as close to 33° F. as conditions will allow. The relevant conditions are solvent load and refrigeration condenser air flow/temperature.

The high pressure refrigerant liquid that is supplied to the low temperature system is expanded to a much lower pressure (temperature) required to maintain the temperature of the solvent entering stripper column 3 at stripper liquid solvent inlet 11 at −20° F. or below. The refrigeration system thus requires two compressors, one for the low temperature side and one for the high temperature side. The two stage refrigeration system allows the highest refrigeration load to be taken at the highest temperature where the system has the greatest capacity and efficiency. It also allows the system to use only one refrigeration condenser unit.

There is a liquid solvent recirculation loop comprised of cold sump 7, pump 49, heat exchanger 75 and 81, stripper column 3 and condenser column 11. This recirculation loop is essentially closed in that there is no solvent loss. Excess solvent is added to the system via solvent vapor recovery. This excess solvent overflows both the transition sump 19 and the cold sump 7 eventually finding its way to receiver 65.

Opposite the general rule for carbon adsorbers, the effective application of the vapor recovery system of the present invention depends upon minimizing the amount of air entering the system. The objective is to capture solvent vapor in the highest concentration possible and at the highest temperature, short of the solvent boiling point. The vapor recovery system of the present invention will allow the user to recover most of the solvent from a concentrated inlet stream on a once through basis. Minimization of air in the process by avoiding air infiltration, by raising inlet stream temperature and keeping exit temperatures low are major contributors to high recovery efficiency.

Thus, the process of the present invention is operated in two stages, a high temperature stage and a low temperature stage or, more particularly, a stage above 32° F. and a stage below 32° F. The first stage receives the inlet process stream and reduces its temperature to as close to the freezing point of water as practical. Practicing the process in two stages also allows the refrigeration system to be operated in two stages which, in turn, allows taking the first stage heat load at a higher temperature than the lowest process temperature required. Refrigeration systems are more efficient and have greater capacity at higher temperatures. The net result is a reduction in the refrigeration power requirements by approximately fifty (50%) percent.

Another advantage of operating the process in two stages is that it allows the combination of the two refrigeration stages such that only a single refrigeration condenser assembly is required thus reducing cost and physical size of the unit. Further, operation of the high temperature side, that is, the condenser column 5 provides for the stripping out of the maximum amount of water in its liquid form. This reduces the water ice problem in the second, low temperature stage, that being the stripper column 3. The high temperature side of the process further provides for the stripping out of a major fraction of the solvent above the temperature at which "Freon- 113"/water hydrate forms. This reduces operability problems.

As the process stream is cooled below 32° F. in the stripper column 3, water contained in the air/vapor stream freezes in stripper column 3. After a period of time water ice blocks the flow of the process stream through packing 15 and there pressure drops across stripper column 3 increases. It is therefore preferable to measure the pressure drop across stripper column 3. When the pressure drop reaches a preset point, relatively warm solvent is directed from the cold sump to the stripper inlet nozzle 11 through motor operated valve 69 and conduit 71. The warm solvent enters stripper column 3 thus melting the ice and returning the process stream pressure drop to a nominal value. This defrost cycle takes only approximately one minute and does not significantly impact the recovery efficiency of the process.

It should be understood that solvent used in the process of the present invention is the material being stripped from the air/vapor mixture. That is, if the process stream is a mixture of air and Freon-113, then the stripper solvent is also Freon-113.

Another unexpected effect achieved through the process of the present invention was found at the stripper exit 9. The solvent wet bulb temperature comes into virtual equilibrium with the temperature of the incoming solvent being fed into the top of the stripper column 3. The air temperature at the stripper exit 9 is always a few degrees (10° F. to 20° F.) and warmer than the incoming solvent. This means that the benefit of the low solvent wet bulb temperature is gained without having to cool the accompanying air to equilibrium with the solvent temperature. This results in a further reduction of power requirements although to a lesser degree.

The vapor recovery system of the present invention may be operated in both a once through mode and a recirculating mode. Operating in a recirculating mode requires that the air/vapor stream or a fraction of the air/vapor stream exiting exit nozzle 9 be recirculated back to inlet nozzle 45. Better overall vapor recovery results from operating in a recirculation mode.

Although the only solvent discussed herein in detail is Freon-113, the system can be used to recover a variety of different solvents. Such solvent include perchloroethylene, trichloroethylene, 1,1,1-trichloroethane and methylene chloride.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features in subcombinations. This is contemplated by and is within the scope of the claims.

As many possible embodiments may be made to the invention.

As many possible embodiments may be made to the invention without the departing from the scope thereof, it is to be understood that all matter herein set forth or shown in the accompanying drawings is to be interpreted as illustrative and not in a limiting sense.

What is claimed is:

1. A process for removing solvent vapor from an air/solvent vapor mixture comprising the steps of:
   (a) conducting the air/solvent vapor mixture through a condenser column;
   (b) simultaneously conducting liquid solvent at a temperature above 32° F. countercurrently through the condenser column thereby condensing a portion of the solvent vapor in the air/solvent vapor mixture to form a first condensate;
   (c) conducting the air/solvent mixture exiting the condenser column through a stripper column;
   (d) simultaneously conducting liquid solvent at a temperature below 32° F. countercurrently through the stripper column thereby condensing substantially all of the solvent vapor in air/solvent vapor mixture exiting the condenser column to form a second condensate.

2. A process for removing solvent vapor from an air/solvent vapor mixture as recited in claim 1 further comprising the steps of:
   (a) draining the liquid solvent and the first condensate from the condenser column to a cold sump;
   (b) draining the liquid solvent and the second condensate from the stripper column;
   (c) exhausting air from the stripper column.

3. A process for removing solvent vapor from an air/solvent vapor mixture as recited in claim 2 further comprising the step of;
   circulating liquid solvent from the cold sump through a cooling means to the top of the condenser column.

4. A process for removing solvent vapor from an air/solvent vapor mixture as recited in claim 1 further comprising the steps of:
   deflecting the liquid solvent and the first condensate entering the cold sump such that it is traveling substantially horizontally as it enters a pool of liquid contained with the cold sump.

5. A process for removing solvent vapor from an air/solvent vapor mixture as recited in claim 1 further comprising:
   (a) collecting the liquid solvent and the second condensate exiting the stripper column in a transition sump;
   (b) recirculating at least a portion of the liquid solvent and the second condensate from the transition sump back to the stripper column;
   (c) cooling the portion of the liquid solvent and the second condensate before it is recirculated back to the stripper column.

6. An apparatus for removing solvent vapor from an air/solvent vapor mixture comprising:
   (a) a condenser column;
   (b) a stripper column connected in series to said condenser column such that the air/solvent vapor mixture rises first through said condenser column and then through said stripper column;
   (c) means for conducting the air/solvent vapor mixture first through said condenser column and then through said stripper column;
   (d) a first conduit connected to said condenser column for supplying a simultaneous countercurrent flow of liquid solvent at a temperature below 32° F. through said condenser column to thereby condense a portion of the solvent vapor contained in the air/solvent vapor mixture;
   (e) a second conduit connected to said stripper column for supplying a simultaneous countercurrent flow of liquid solvent at a temperature below 32° F. through said stripper column.

7. An apparatus for removing solvent vapor from an air/solvent vapor mixture as recited in claim 6 further comprising:
   (a) means for draining the liquid solvent from said condenser column;
   (b) means for draining the liquid solvent from said stripper column;
   (c) means for exhausting air from said stripper column.

8. An apparatus for removing solvent vapor from an air/solvent vapor mixture as recited in claim 6 further comprising:
   (a) a transition sump residing within said condenser column for collecting liquid solvent exiting said stripper column;
   (b) a distribution plate located between said transition sump and said stripper column, said distribution plate ensuring that the air/solvent vapor mixture circulating upward through said stripper column is evenly distributed as said air/solvent vapor mixture enters said stripper column;
   (c) a plurality of passages through said transition sump for allowing the air/solvent vapor mixture exiting said condenser, to pass through said transition sump and into said stripper column.

9. An apparatus for removing solvent vapor from an air/solvent vapor mixture as recited in claim 6 further comprising:
   (a) a cold sump connected to said condenser column, for receiving liquid solvent from said condenser column, said cold sump containing a pool of liquid solvent;
   (b) a splash plate located within said cold sump so that as the liquid solvent enters said pool from said condenser column, liquid solvent is traveling substantially horizontally.

10. An apparatus for removing solvent vapor from an air/solvent vapor mixture as recited in claim 9 further comprising:
    (a) An overflow from said cold sump to a water separator.
    (b) a weir in said overflow pipe, said weir being located substantially at the liquid level of said pool within said cold sump.

11. An apparatus for removing solvent vapor from an air/solvent vapor mixture as recited in claim 6 further comprising:
    (a) a first bed of packing contained within said stripper column;
    (b) a second bed of packing contained within said condenser column.

* * * * *